United States Patent [19]

Beppu et al.

[11] Patent Number: 4,508,549
[45] Date of Patent: Apr. 2, 1985

[54] PRESSURE REDUCTION APPARATUS FOR SOLID PARTICLE-CONTAINING HIGH PRESSURE LIQUIDS

[75] Inventors: Kohichi Beppu, Nishinomiya; Shigezo Kawakami, Kobe, both of Japan

[73] Assignee: Kabushiki Kaisha Kobe Seiko Sho, Kobe, Japan

[21] Appl. No.: 516,283

[22] Filed: Jul. 22, 1983

[30] Foreign Application Priority Data

Jul. 24, 1982 [JP] Japan ................................. 57-129164
Mar. 7, 1983 [JP] Japan ................................. 57-37170
May 25, 1983 [JP] Japan ................................. 58-93245

[51] Int. Cl.³ ............................................. B01D 19/00
[52] U.S. Cl. ........................................ 55/165; 55/189; 55/274
[58] Field of Search .................... 55/40, 43, 159, 164, 55/165, 189

[56] References Cited

U.S. PATENT DOCUMENTS 2,500,916  3/1950  Whaley, Jr. ............................... 55/43
2,616,514  11/1952  Shobe ..................................... 55/165
2,792,903  5/1957  Hoff ....................................... 55/43

FOREIGN PATENT DOCUMENTS

53424  6/1982  European Pat. Off. ................. 55/43

Primary Examiner—Robert Spitzer
Attorney, Agent, or Firm—Oblon, Fisher, Spivak, McClelland & Maier

[57] ABSTRACT

A pressure reduction apparatus for solid particle-containing high pressure liquids is described. The apparatus includes a gas and liquid pressure reduction tower having a gas phase zone and a liquid phase zone, a high pressure gas and liquid separation tower which has a gas phase zone connected to the gas phase zone of said gas and liquid pressure reduction tower through a first line provided with a high pressure gas charge or discharge valve, and a liquid phase zone connected to the liquid phase zone of said gas and liquid pressure reduction tower through a second line having a feed valve for liquid being reduced, and a low pressure gas and liquid separation tower which has a gas phase zone connected to the gas phase zone through a third line having a low pressure gas charge or discharge valve, and a liquid phase zone connected to the liquid phase zone through a fourth line having a valve through which a pressure reduced liquid is discharged. Prior to opening of the feed valve or the pressure-reduced liquid discharge valve, the high pressure gas charge or discharge valve, or the low pressure gas charge or discharge valve is opened thereby increasing or decreasing the pressure within a corresponding gas and liquid separation tower.

14 Claims, 12 Drawing Figures

PRESSURE REDUCTION APPARATUS FOR SOLID PARTICLE-CONTAINING HIGH PRESSURE LIQUIDS

BACKGROUND OF THE INVENTION

1. Field of the Invention

This invention relates to a pressure reduction apparatus for solid particle-containing high pressure liquids and, more particularly, a pressure reduction apparatus for use in chemical plants which deal with high pressure liquids comprising solid particles such as solutions of coal liquefaction products from coal liquefaction plants.

2. Description of the Prior Art

A variety of chemical plants utilizing a process of reducing the pressure of high pressure liquids containing solid particles are known. Typical of such plants are coal liquefaction plants which have been recently reperceived accompanied by worsening of the condition of petroleum supply. In coal liquefaction plants, coal is pulverized and dehydrated, after which suitable solvents are added to the coal pieces to form a slurry. The slurry is pressurized and pre-heated, and is subjected to liquefaction by hydrogenation reaction. The resulting high temperature and high pressure coal liquefaction solution product is subjected to the gas-liquid separation, followed by pressure reduction. Then, the heavy and light oil products are fractionally distilled as they are or after further gas-liquid separation. For pressure reduction of the solution of coal liquefaction product, it is the usual practice to make use of the throttling effect of a flow regulator valve and is usually referred to as a let-down valve. However, a member of the valve which contacts with the solution tends to be considerably damaged by solid particles of organic matter contained in the solution. In view of the above fact, there has been proposed, for example, in Japanese Patent Application No. 56-108365, an apparatus in which pressure energy is recovered simultaneously with the pressure reduction of the high pressure liquid or solution. In this energy recovery apparatus, the solution of coal liquefaction product is fed to a cylinder in which the pressure energy is converted into and recovered as mechanical energy. The solution which has been reduced in pressure by the conversion is fed to a subsequent step by the use of mechanical energy from other cylinders. However, the mechanical motion in the energy converter involves problems such as abrasion or erosion of and a thermal influence on sliding portions and valves which contact with the solution.

SUMMARY OF THE INVENTION

It is accordingly an object of the present invention to provide a pressure reduction apparatus for solid particle-containing high pressure solutions or liquids in which the damage by abrasion of valves or other members of the apparatus which directly come into contact with the liquids is reduced to a minimum.

It is another object of the invention to provide a pressure reduction apparatus for solid particle-containing high pressure liquids which is easily maintained and has excellent durability.

It is a further object of the invention to provide a pressure reduction apparatus for solid particle-containing high pressure liquids in which energy of high pressure gas in the apparatus is recovered as mechanical or electric power upon reduction of the pressure.

It is a still further object of the invention to provide a pressure reduction apparatus of the above-mentioned type in which feeding of the high pressure liquid during the course of pressure reduction is controlled based on a detected amount of a gas in a pressure reduction unit.

It is another object of the invention to provide a pressure reduction apparatus of the above-mentioned type in which feeding of the high pressure liquid or high and/or low pressure gas is effectively controlled by pressure control valves.

The above objects can be achieved, according to the invention, by a pressure reduction apparatus for solid particle-containing high pressure liquids which comprises:

a gas and liquid pressure reduction tower having a gas phase zone and a liquid phase zone;

a high pressure gas and liquid separation tower which has a gas phase zone connected to the gas phase zone of said gas and liquid pressure reduction tower through a first line provided with a high pressure gas charge or discharge valve, and a liquid phase zone connected to the liquid phase zone of said gas and liquid pressure reduction tower through a second line having a feed valve for a liquid being reduced; and a low pressure gas and liquid separation tower which has a gas phase zone connected to the gas phase zone through a third line having a low pressure gas charge or discharge valve, and a liquid phase zone connected to the liquid phase zone through a fourth line having a valve through which a pressure reduced liquid is discharged.

Wherein prior to opening of the feed valve or the pressure-reduced liquid discharge valve, the high pressure gas charge or discharge valve, or the low pressure gas charge or discharge valve is opened thereby increasing or decreasing the pressure within a corresponding gas and liquid separation tower.

The gas and liquid separation tower may be made of a single tower unit or a plurality of tower units each having a high pressure gas charge or discharge valve and a low pressure gas charge or discharge valve arranged in a manner as recited in the above system.

BRIEF DESCRIPTION OF THE INVENTION

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIGS. 7(*a*) through 7(*d*) are illustrative views showing a variation of liquid level in one cycle of the gas and liquid pressure reduction tower of FIG. 6.

DETAILED DESCRIPTION OF THE PREFERRED EMBODIMENTS

Broadly, the pressure reduction apparatus for solid particle-containing high pressure liquids according to the present invention is characterized by a gas and liquid pressure tower which has a feed valve for a liquid being reduced and a discharge valve for a pressure-reduced liquid at a lower side or zone thereof, and a high pressure gas charge or discharge valve and a low pressure gas charge or discharge valve at an upper side or zone thereof. In this arrangement, the high pressure gas charge or discharge valve, or the low pressure gas charge or discharge valve is opened prior to opening of the feed valve for liquid being reduced or the reduced liquid discharge valve thereby increasing or decreasing the pressure in the apparatus.

Reference is now made to the accompanying drawings in which like parts are indicated by like numeral references throughout the specification.

Figure 1:
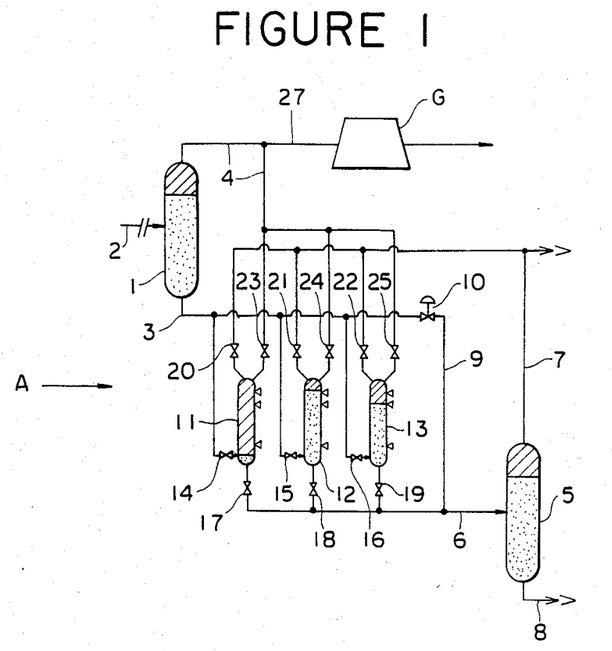
FIG. 1 is a flow chart of a pressure reduction apparatus according to one embodiment of the invention.

In FIG. 1, there is shown a pressure reduction apparatus A of the present invention applied to a coal liquefaction plant. In the figure, indicated at 1 is a high pressure gas and liquid separation tower used in a coal liquefaction plant, at 2 is a feed line for a solution of coal liquefaction product, and at 5 is a low pressure gas and liquid separation tower. Similarly, indicated at 11, 12, 13 are, respectively, gas and liquid pressure reduction towers, at 14, 15, 16 are feed valves 14, 15, 16 for a liquid being reduced in pressure and at 17, 18, 19 are pressure-reduced liquid discharge valves. Indicated at 20, 21, 22 are low pressure gas charge or discharge valves and at 23, 24, 25 are high pressure gas charge or discharge valves. The gas and liquid pressure reduction towers 11 through 13 are interconnected in parallel to each other though the valves 14 through valve 16, 17 through valves 19, 20 through 22, and valves 23 through 25, respectively. Further, the towers 11 through 13 are connected through the feed valves 14 through valve 16 and a line 3 to the high pressure gas and liquid separation tower 1 at the bottom thereof and also through the valves 23 through 25 and a line 4 to the tower 1 at the top thereof. On the other hand, the towers 11-13 are also connected through the valves 17 through 19 and a line 6 to the lower pressure gas and liquid separation tower 5 at an intermediate portion thereof and through the valves 20 through 22 and a line 7 to the top of the tower 5. Between the lines 3 and 6 is connected a by-pass line 9 having a pressure reduction valve 10 for safety purposes.

In operation, the individual gas and liquid pressure reduction towers 11 through 13 are operated by sequence control of the respective valves in a cycle comprising liquid feed, pressure reduction, liquid discharge, and pressure elevation. This is particularly described with regard to the gas and liquid pressure reduction tower 11 which is in a state where the pressure elevation step has been completed. In the state A of FIG. 2 where the pressure elevation step has been completed, the high pressure gas charge or discharge valve 23 is opened and the other valves 14, 17, 20 are closed. The level of liquid in the tower 11 is positioned at $L_1$ of FIG. 2. When the feed valve 14 is opened, a high pressure solution of coal liquefaction product (e.g. 250 kg/cm$^2$) is fed from the gas and liquid separation tower 1 into the pressure reduction tower 11. The liquid in the tower 11 is moved from A to B along the indicator diagram of FIG. 2, by which the level of the liquid rises from $L_1$ to $L_3$, after which the high pressure gas charge or discharge valve 23 is first closed and then the feed valve 14 is closed. During this period, the high pressure gas flows backward through the line 4 and is released from a line 27. When the low pressure gas charge or discharge valve 20 is opened, a gas dissolved in the solution within the tower 11 is discharged toward the line 7 along with a remaining high pressure gas at the top of the pressure reduction tower 11. As a consequence, the solution is reduced in pressure to a certain level (e.g. 100 kg/cm$^2$) (state B→state C). At the time, the level of the liquid in the pressure reduction tower 11 increases from $L_3$ to $L_4$, and the gas phase and the liquid phase in the tower 11 reach an equilibrium. In this state, the pressure-reduced liquid discharge valve 17 is opened, by which the low pressure gas is passed from the valve 20 into the pressure reduction tower 11 while discharging the reduced solution of coal liquefaction product from the tower 11 into the low pressure gas and liquid separation tower 5 (state C→state D). Accordingly, the liquid level in the pressure reduction tower 11 decreases from $L_4$ to $L_2$. At the time when the state reaches D, the low pressure gas charge or discharge valve 20 is first closed and then the discharge valve 17 for the pressure-reduced liquid is closed, followed by opening the high pressure gas charge or discharge valve 23. By this procedure, the liquid in the tower 11 increases in pressure to the same level as the high pressure gas (state D→state A). The liquid level decreases from $L_2$ to $L_1$. After reaching equilibrium, the system is repeatedly subjected to a subsequent cycle. This operation cycle is effected on the respective gas and liquid pressure reduction towers, i.e. the towers are so operated that the liquid charge and discharge steps are continuously performed in one cycle, or the amounts of the solution of coal liquefaction product passing through the lines 3 and 6 are maintained at constant levels. The time chart concerning opening and closing the gas and liquid pressure reduction towers 11, 12, 13 is shown in FIG. 3, in which the mark represented by "▭" and "▨" means a state where each of designated valves is opened.

As will be apparent from the above, the pressure reduction apparatus of the invention is so operated that the pressure reduction of the liquid in the pressure reduction tower is effected by properly operating the high pressure gas charge or discharge valve and the low pressure gas charge or discharge valve, so that no erosion of the valves by solid particle of organic matter is involved. In addition, the feed valves of a liquid to be reduced and the pressure-reduced liquid discharge valves are opened or closed in such a state that there is no difference in pressure between the pressure reduction tower and either of the gas and liquid separation towers and no flow of liquid occurs. Accordingly, abrasion of the valves can be reduced to a substantial extent. Moreover, no sliding members such as a plunger and a piston as used in known apparatuses are used. This is very advantageous in that no sealing between the sliding member and a cylinder is needed so as to result in maintenance and a remarkable improvement of durability.

In the above embodiment, the operation of one gas and liquid pressure reduction tower is illustrated but a plurality of the towers as shown in FIG. 1 which have the respective high pressure gas charge or discharge valves and the low pressure gas charge or discharge valves connected parallel to one another will ensure constant flows of liquids charged or discharged from the gas and liquid separation towers 1 and 5.

In accordance with another embodiment of the invention, there is recovered pressure energy as power at high efficiency. The energy recovery may be effected most simply, for example, by connecting an expansion machine G to the line 27 of FIG. 1 through which the high pressure gas is passed backward as mentioned hereinbefore. In order to much more efficiently recover pressure energy, a feed valve and a first expansion machine connected in series are connected parallel to the high pressure gas charge or discharge valve, and the high pressure gas is fed into the pressure reduction tower through the series connection of the feed valve and the first expansion machine. Moreover, another series circuit of an exhaust valve for pressure reduction and a second expansion machine is connected in parallel to the low pressure gas charge or discharge valve. The high pressure gas is exhausted through this series circuit. By this arrangement, pressure energy can be recovered as power at the time of charge and discharge of the high pressure gas. This is particularly described in FIG. 4.

Figure 4:
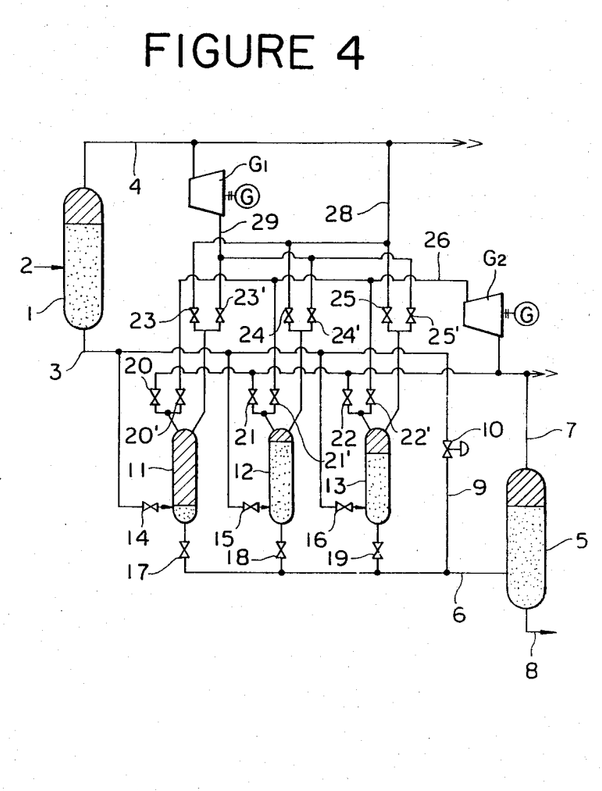
FIG. 4 is a view similar to FIG. 1 and shows another embodiment of the invention.

In the apparatus of FIG. 4, there is provided a series circuit composed of gas feed valves 23' through 25' for pressure elevation and a first expansion machine $G_1$ such as a turbine associated in common with the gas feed valves 23' through 25'. This series circuit is arranged parallel to the high pressure gas charge or discharge valves 23 through 25. Likewise, in parallel to the charge valves 20 through 22 for low pressure gas is provided another series circuit composed of exhaustion valves 20' through 22' for pressure reduction and a second expansion machine $G_2$ such as a turbine. For convenience' sake, the first and second expansion machines are separately provided and are directly connected to generators G, respectively. It is preferable to arrange the machines with the same alignment.

It will be noted that the high pressure gas discharge valves 23 through 25 and the feed valves 23' through 25' may be replaced by charge-over valves. This is true of the low pressure gas charge valves 20 through 22 and the exhaustion valves 20' through 22'.

Figure 2:
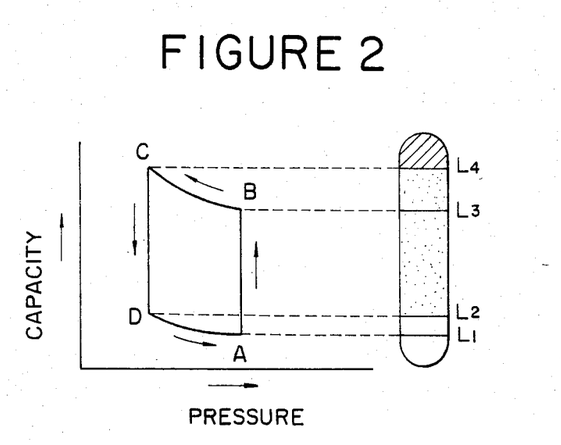
FIG. 2 is an indicator diagram of the apparatus of FIG. 1.
Figure 3:
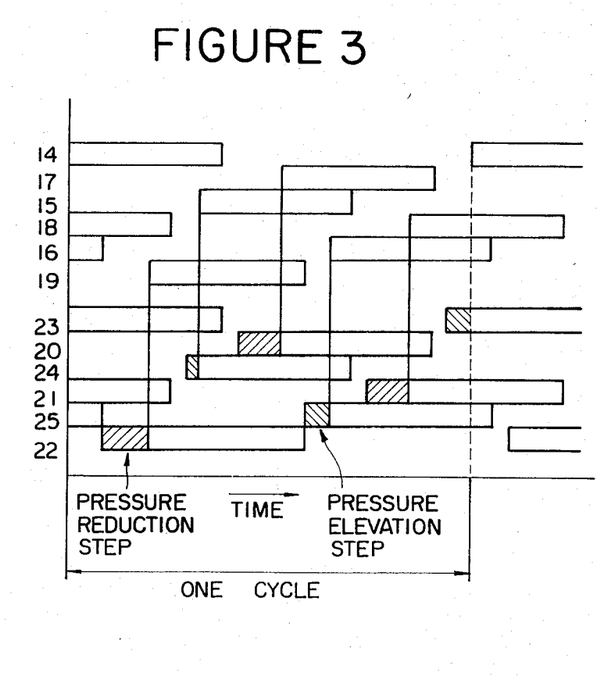
FIG. 3 is a time chart showing an opening and closing operation sequence of valves of the apparatus of FIG. 1.
Figure 5:
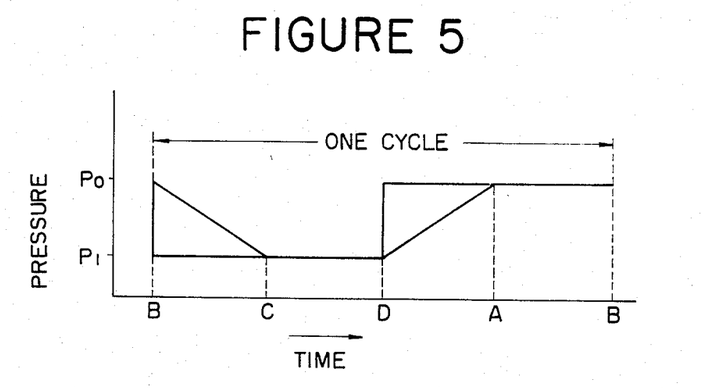
FIG. 5 is a diagram showing the relation between the pressure and the recovered power in one pressure reduction tower of the apparatus of FIG. 4.

In operation, in the state A of FIG. 2 where the pressure elevation has been complete, the valves 14, 17, 23, 23', 20 and 20' are all closed. When the high pressure liquid feed valve 14 is opened and the high pressure gas discharge valve 23 is opened, the liquid feed step starts (A→B). The high temperature high pressure liquid or solution is fed from the high pressure gas and liquid separation tower 1 through the line 3 to the pressure reduction tower 11 by which the liquid level in the tower increases from $L_1$ to $L_3$. At this time, the high pressure gas in the pressure reduction tower 11 is passed through the valve 23 and a line 28 into the line 4. When the liquid level reaches $L_3$, the valve 23 is first closed and then the high pressure liquid charge valve 14 is closed to complete the feed of the liquid. Subsequently, when the pressure reduction exhaustion valve 20' is opened, the pressure reduction step (B→C of FIG. 2) starts in which not only the gas in the pressure reduction tower 11 but also a gas flushed from the liquid is fed through the line 26 into the second expansion machine $G_2$ such as a turbine. By this, the pressure energy is recovered as power in the machine $G_2$. The gas whose pressure has been reduced is passed into the line 7. By the pressure reduction step, the liquid level in the pressure reduction tower 11 increases from $L_3$ to $L_4$. The recovered energy decreases, as shown in FIG. 5, as the pressure within the tower 11 changes from an initial pressure $P_0$ which is equal to the pressure within the high pressure gas and liquid separation tower 1, to pressure $P_1$ equal to the pressure within the low pressure gas and liquid separation tower 5.

At the time when the pressure within the pressure reduction tower 11 reaches the pressure $P_1$ within the low pressure gas and liquid separation tower, the valve 20' is closed and then the low pressure gas charge valve 20 is also opened to effect the discharge step (C→D). That is, the low pressure gas is passed from the gas and liquid separation tower 5 through the line 7 and the valve 20 into the pressure reduction tower 11. On the other hand, the liquid or solution whose pressure has been reduced is discharged through the pressure reduction tower 11 into the separation tower 5, by which the liquid level within the separation tower 11 is dropped from $L_4$ to $L_2$. Thereafter, the low pressure gas charge valve 20 is closed, after which the discharge valve 17 is closed to complete the discharge operation. Upon opening of the feed valve 23', the pressure elevation step (D→A) starts. In this pressure elevation step, the high pressure gas from the high pressure gas and liquid separation tower 1 acts to drive the first expansion machine 30 whereby the pressure energy is recovered as power. The gas is fed through the feed valve 23' into the pressure reduction tower 11. Accordingly, the pressure within the tower 11 gradually increases to a level of the pressure $P_0$ within the separation tower 1 or the pressure of the liquid in the line 3. The liquid level in the tower 11 decreases from $L_2$ to $L_1$. As shown in FIG. 5, the energy recovered by the first expansion machine decreases, similar to the case of the pressure reduction step, as the pressure within the pressure reduction tower 11 increases. When the pressure within the tower 11 reaches $P_0$, the feed valve 23' is closed to complete the pressure elevation operation, followed by a subsequent cycle. This operation cycle is also effected in the same manner with respect to the other pressure reduction towers 12, 13.

In order to ensure proper operation of the pressure reduction apparatus of the type described above, it is necessary to open or close valves after the liquid level or pressure in the pressure reduction apparatus has reached a given value. Known level gauges of the differential pressure or electrostatic capacitance type undergo severe temperature and pressure conditions, leading to many problems. In order to overcome the above disadvantage, there are provided, according to a further embodiment of the invention, a first detector means in the line 4 connecting the high pressure gas and liquid separation tower 1 and the pressure reduction tower 11 and a second detecting means in the line 7 connecting the pressure reduction tower 11 and the low pressure gas and liquid separation tower 5 thereby detecting quantities of gases charged or discharged through the high and low pressure gas charge or discharge valves 23 and 20, respectively. The feeding of high and low pressure liquids charged into and discharged from the pressure reduction tower is controlled based on the detected gas quantities. This embodiment is based on the fact that under certain pressure and temperature conditions, a gas and a liquid have the same volume, so that an amount of liquid charged into or discharged from the gas and liquid pressure reduction tower is the same as an amount of liquid discharged from or charged into the tower. In other words, a change in liquid level in the tower is proportional to an amount of gas charged into or discharged from the tower. More particularly, when a liquid is charged into or discharged from the gas and liquid separation tower, arrival of the liquid level at a predetermined value is detected by an amount of gas charged into or discharged from the pressure reduction tower. According to the detected signal, the high pressure liquid feed valve and the high pressure gas charge or discharge valve, or the low pressure liquid discharge valve and the low pressure gas charge or discharge valve are so controlled as to be closed, followed by opening the low pressure gas charge or discharge valve or high pressure gas charge or discharge valve. Although the opening of the high pressure liquid feed valve and the low pressure liquid discharge valve may be effected after a predetermined period of time after the high or low pressure gas charge or discharge valve has been opened, it is preferable to detect inner pressures of the gas and liquid pressure reduction tower, high pressure gas and liquid separation tower, and low pressure gas and liquid separation tower, and compare these pressures with one another. When the inner pressure within the pressure reduction tower with those pressures within the separation towers, the high pressure liquid feed valve and the low pressure liquid discharge valve are opened.

Control of a liquid charged into or discharged from the pressure reduction tower is particularly described with reference to FIG. 6, in which indicated at $D_1$ and $D_2$ are, respectively, first and second detector means for detecting flow rates of gases charged into and discharged from the pressure reduction tower 11 and at L is a level gauge for detecting the level of liquid in the tower 11. For convenience' sake, only one pressure reduction tower 11 is shown in FIG. 6 but a plurality of towers may be controlled in the same manner as described above.

Figure 7A:
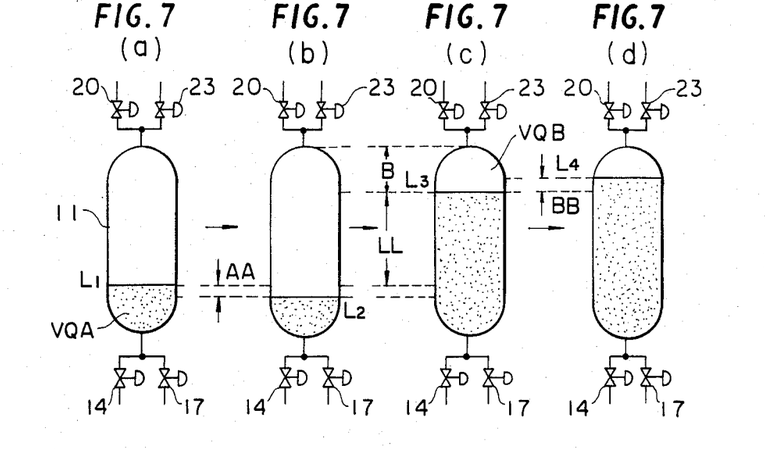
Figure 8:
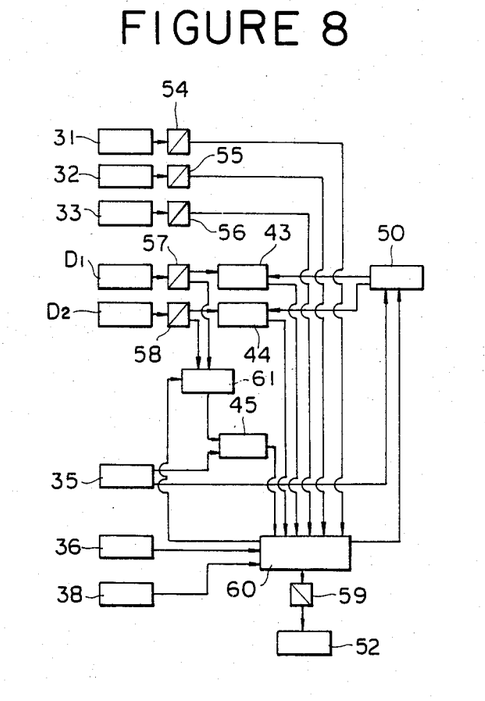
FIG. 8 is a block diagram of a control device used to carry out the controlling operation of the apparatus of FIG. 6.

The manner of control is illustrated with reference to FIGS. 7 and 8. In FIG. 8, indicated at 31 is a pressure detector within the high pressure gas and liquid separation tower 1, at 32 is a pressure detector within the pressure reduction tower 11, and at 33 is a pressure detector within a low pressure gas and liquid separation tower 5. At 35 is a critical charge or discharge level setting means for a liquid within the pressure reduction tower 11, at 36 is a means for setting gas and liquid properties, and at 38 is a calculator for capacities of various sections of the pressure reduction tower 11. At 43–45 are comparators, at 50 is an indicator of an amount of charge or discharge gas, at 52 is an actuator indicator, and at 54–58 are A/D converters. At 59 is a D/A converter and at 60, 61 are microcomputers.

Figure 6:
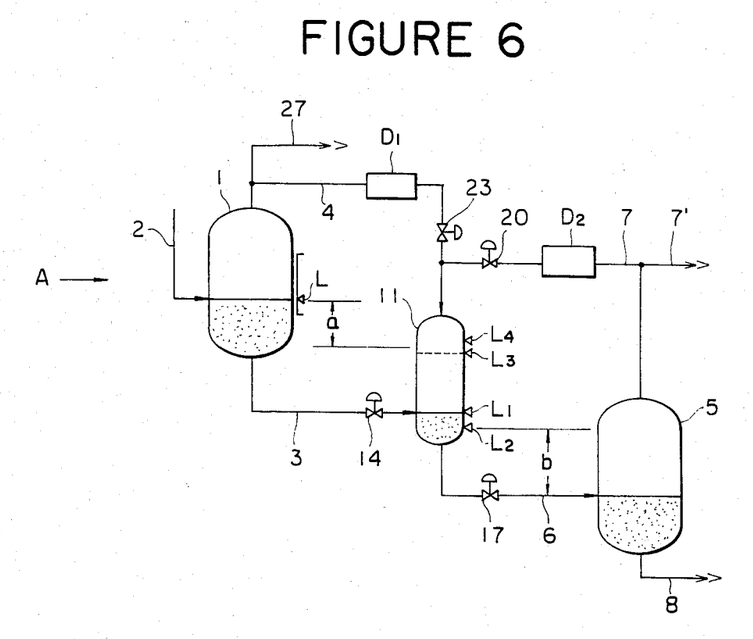
FIG. 6 is a flow chart showing a gas and liquid pressure reduction apparatus according to a further embodiment of the invention.

In operation, assuming that the gas and liquid pressure reduction apparatus A is in such a state that the discharge of liquid has been accomplished as in FIG. 6, the valves 14, 17, 20 and 23 are all closed. The liquid within the pressure reduction tower 11 is at a critical discharge level $L_1$ for the low pressure liquid. The amount of the liquid is equal to an inner capacity of a zone of the pressure reduction tower 11 covering from the critical discharge level $L_1$ to the bottom of the tower. The volume of the gas is equal to a sum of an inner volume VQLL defined by the level $L_1$ and the critical level $L_3$ for high pressure liquid feed and an inner volume VQB defined by the level $L_3$ and the top of the tower 11, i.e. VQLL + VQB. The pressure within the tower 11 is the same as the pressure $P_2$ within the low pressure gas and liquid separation tower 5. Under these conditions, a signal is inputted from the microcomputer 60 through the D/A converter 59 to the actuator indicator 52 to energize a solenoid which acts on an actuator of the high pressure gas charge or discharge valve 23. When the valve 23 is opened, a predetermined amount of the high pressure gas is fed from the separation tower 1 through the line 4 into the pressure reduction tower 11 thereby increasing the inner pressure of the tower 11 and compressing the liquid. Accordingly, the liquid level is dropped from $L_1$ by a distance, LL, as shown in FIG. 7(b). At this time, an amount of the gas fed into the tower 11 is detected by the flow rate detector $D_1$ at the high pressure side. The output signal for the detector $D_1$ is passed through the A/D converter 57 into the comparator 43 and the microcomputer 61. In the microcomputer 61, a variation of the liquid level accompanied by the charged high pressure gas is calculated to determine a liquid level at the time. This is compared in the comparator 45 with a signal from the level setting means 35. An output signal from the comparator 45 is inputed to the microcomputer 60 to check the level $L_1$ in the liquid discharge step.

In order to improve the accuracy of the detection and operation of the liquid level, signals from the means 36 and the pressure detectors 31 through 33 may be inputted to the microcomputer 60 whose output signal is then passed into the microcomputer 61.

Output signals from the pressure detectors 32 and 31 for detecting a pressure within the tower 11 and a pressure within the separation tower 1 are compared with each other. When the pressures are detected as being equal, a signal of opening the feed valve 14 from the microcomputer 60 is sent through the D/A converter 59 to the actuator indicator 52 thereby opening the valve 14. In a subsequent liquid feed step, the high pressure liquid is fed from the separation tower 1 into the pressure reduction tower 11 and at the same time, the high pressure gas is passed from the pressure reduction tower 11 through the high pressure gas charge or discharge valve 23 to the line 4. The line 4 is controlled at the side of the line 27 so that the pressure therein is held constant. An output signal corresponding to an amount of gas detected by the flow rate detector $D_1$ is compared in the comparator 43 with a signal from the indicator 50 which is capable of outputting a signal corresponding to an amount of an exhausted gas, VQLL+VQBB, necessary for liquid feeding after reception of a signal from the critical level setting means 35 for the charge or discharge liquid in the pressure reduction tower. When the amounts agree with each other, the signal from the comparator 43 is passed to the microcomputer 60, from which a signal is passed through the D/A converter to the actuator indicator 52 so that the feed valve 14 and the high pressure gas charge or discharge valve 23 are closed. As a result, the valves 14 and 23 are closed to complete the liquid feeding step, so that the amount of gas in the pressure reduction tower 11 is reduced to VQB as shown in FIG. 7(c).

After completion of the liquid feeding step, the low pressure gas charge or discharge valve 20 is opened by a signal from the microcomputer 60. The high pressure gas in the pressure reduction tower 11 is discharged through the lines 7, 7' to the outside. The pressure within the tower 11 is reduced to an inner pressure of the separation tower 5. At this time, an amount of gas, VQEP, released from the tower 11 into the line 7 is detected by the gas flow rate detector $D_2$ and an output signal from the detector $D_2$ is sent, after A/D conversion, to the microcomputer 61 and the comparator 44. While the liquid level is checked by the microcomputer 61, the critical level $L_3$ in the preceding step is checked from a change, BB, caused by the pressure change. In this pressure reduction step, the liquid level increases from $L_3$ to $L_4$ whereas the amount of gas decreases to VQB−VQBB as shown in FIG. 7(d). It is detected from signals from the pressure detectors 32 and 33 that the pressure within the pressure reduction tower 11 has become equal to the pressure $P_2$ within the separation tower 5. After completion of the expansion step, a command for opening the discharge valve 17 is outputted from the microcomputer 60 thereby opening the valve 17. In a subsequent liquid discharge step, the low pressure gas is passed from the separation tower 5 to the pressure reduction tower 11 by an amount representing VQBB+VQLL. At the same time, a pressure-reduced liquid is discharged from the pressure reduction tower 11 to the separation tower 5 in the same amount as the low pressure gas. The liquid level is lowered from $L_4$ to $L_1$. A signal corresponding to the amount of VQLL+VQBB necessary for the liquid discharge is outputted from the indicator 50 according to the signal generated from the critical level setting means 35. This signal is compared in the comparator 43 with an output signal from the gas flow rate detector $D_2$. An output signal generated from the comparator 44 when the compared signals agree to each other is sent to the microcomputer 60, which generates a command signal for closing the low pressure gas charge or discharge valve 20 and the low pressure liquid discharge valve 17, thereby closing the valves through the D/A converter 59 and the actuator indicator 52. This leads to the state of FIG. 7(a).

Because of the presence of solid particles in the liquid which is subjected to the gas and liquid separation in the high pressure separation tower 1, there may occur an accumulation of precipitation in lines. Additionally, there is a fear of coking because no hydrogen is contained. This will cause a gradual increase in resistance of liquid flow. In order to overcome the above, it is necessary that heads a and b of FIG. 6 are made strong and that valve and pipe diameters are also made large. However, this is disadvantageous from the standpoint of design and cost. To overcome this, there is provided, according to a still further embodiment of the invention, a pressure control valve between the high pressure gas and liquid separation tower and the high pressure gas charge or discharge valve so that when a high pressure gas is transferred from the high pressure gas and liquid separation tower to the pressure reduction tower, the pressure within the pressure reduction tower is set to be lower than the pressure within the separation tower. Likewise, a pressure control valve is provided between the low pressure gas charge or discharge valve and the low pressure gas and liquid separation tower so that when a low pressure gas is transferred from the pressure reduction tower to the low pressure gas and liquid separation tower, the pressure within the separation tower is set to be lower than the pressure reduction tower.

This embodiment is particularly described with reference to FIG. 9.

Figure 9:
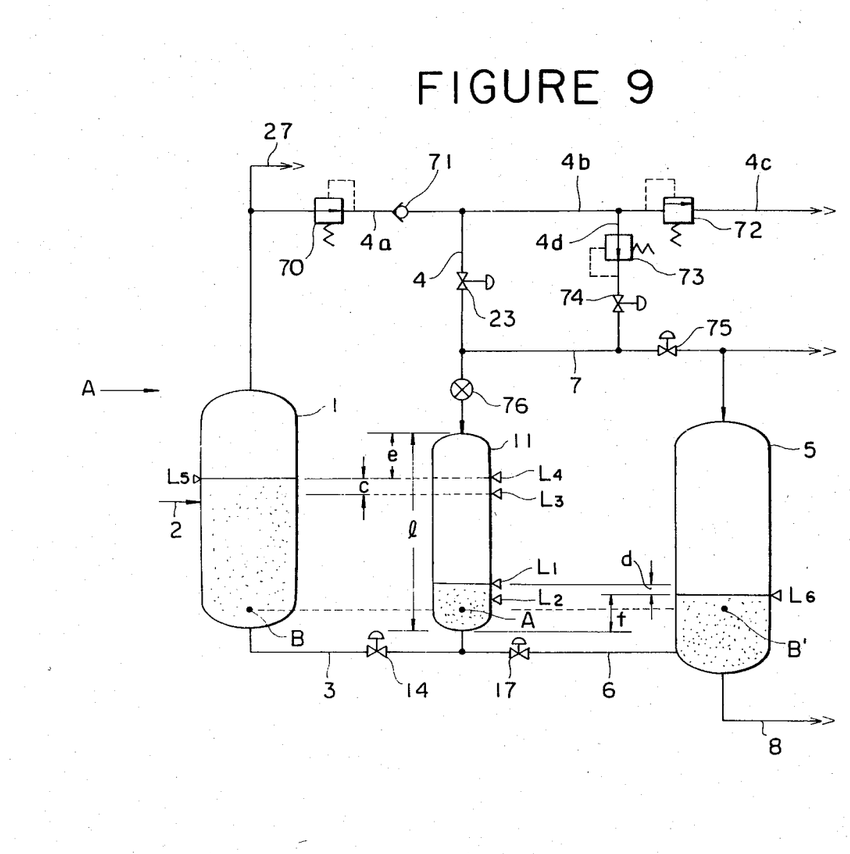
FIG. 9 is a flow chart showing a pressure reduction apparatus used in a coal liquefaction plant according to another embodiment of the invention.

The pressure reduction apparatus A of FIG. 9 includes the line 4 having the high pressure gas charge or discharge valve 23. This line 4 is branched into a feed line 4a and a line 4b. The line 4a is provided with a first pressure control valve or pressure reduction valve 70 and a check valve 71 and is connected to the high pressure gas and liquid separation tower 1. The line 4b is provided with a second pressure control valve or relief valve 72 so that the gas from the high pressure gas and liquid separation tower 1 is discharged through a line 4c while keeping its pressure energy as high as possible and the pressure within the pressure reduction tower 11 is set to be lower than the pressure within the separation tower 1. Because the high pressure gas in the high pressure gas and liquid separation tower 1 is also used as a feed source for low pressure gas, the line 4b is branched to give a low pressure gas feed line 4d. At the line 4d are provided a third pressure control valve or pressure reduction valve 73 and a stop valve 74 so that a pressure within the pressure reduction tower 11 at the time of liquid discharge is set to be higher than the pressure within the separation tower 5. The line 4d is connected to line 7, which is connected to the line 4 at one end and also to the lower pressure gas and liquid separation tower 5 through a discharge valve 75. By the arrangement described above, the liquid can be smoothly transferred from the high pressure gas and liquid separation tower 1 to the pressure reduction tower 11 and also from the tower 5 to the low pressure gas and liquid separation tower 5 by the use of pressure differences established therebetween. In this embodiment, the high pressure liquid feed line 3 through which the high pressure liquid is fed from the separation tower 1 to the pressure reduction tower 11 and the pressure-reduced liquid discharge line 6 through which the pressure-reduced liquid is fed from the pressure reduction tower 11 to the low pressure gas and liquid separation tower 5 may be arranged in the same line as shown in FIG. 9. Additionally, the separation tower 1, the pressure reduction tower 11 and the separation tower 5 may be arranged substantially in the same level of space.

In operation, assuming that the liquid discharge step has now completed, the discharge valve 75 is opened and a pressure $P_1$ within the pressure reduction tower 11 is equal to a pressure $P'_0$ within the low pressure gas and liquid separation tower 5. In this state, when the high pressure gas charge or discharge valve 23 is opened, the high pressure gas in the separation tower 1 is reduced in pressure by the first pressure control valve 70, for example, from 250 kg/cm² to 240 kg/cm². This gas is fed through the check valve 71 and the high pressure gas charge or discharge valve 23 into the pressure reduction tower 11, by which the pressure $P_1$ in the tower 11 increases to a level preset by the first and second pressure control valves 70 and 72. At that time, the other valves are all closed. When the pressure $P_1$ within the pressure reduction tower 11 reaches a preset level, the check valve 71 is closed to complete the compression or pressure elevation step.

In a subsequent liquid feed step, the liquid within the high pressure gas and liquid separation tower 1 is fed to the pressure reduction tower 11 by the difference between the pressure $P'_1$ within the pressure reduction tower 11 set by the first and second pressure control valves 70, 72 and the pressure $P_0$ in the high pressure gas and liquid separation tower 1 and also by the difference in head between the liquid levels of both the towers. The gas in the pressure reduction tower 11 is discharged through the line 23 to the line 4c including the second pressure control valve 72.

When the liquid is fed to the upper limit level $L_3$ of the pressure reduction tower 11, the high pressure gas charge or discharge valve 23 is closed and the check valve 71 is opened to complete the liquid feed step.

In a subsequent pressure reduction step, the high pressure gas in the pressure reduction tower 11 is discharged through the low pressure gas discharge line 7 including the discharge valve 75 to the low pressure gas and liquid separation tower 5. The pressure $P_1$ within the pressure reduction tower 11 is reduced to a level of the preset pressure $P'_0$ of the separation tower 5. Accordingly, the liquid in the pressure reduction tower 11 is expanded, resulting in an increase of the liquid level to a level $L_4$. When the pressure $P_1$ within the pressure reduction tower 11 is reduced to the preset pressure $P'_0$ within the low pressure gas and liquid separation tower 5, e.g. 100 kg/cm$^2$, the discharge valve 75 is closed to complete the pressure reduction step. When the liquid discharge valve 17 is opened and the charge valve 74 is opened, the liquid discharge step commences.

In the liquid discharge step, the high pressure gas which is passed through the high pressure feed line 4a and the high pressure gas discharge line 4b to the low pressure gas feed line 4d acts on the liquid within the pressure reduction tower 11 as a pressure $P''_1$ set by the third pressure control valve or pressure reduction valve 73, e.g. 110 kg/cm$^2$. Accordingly, by the pressure difference between the set pressure $P''_1$ and the pressure $P'_0$ set within the low pressure gas and liquid separation tower 5, i.e. $\Delta P_2 = P'_0 - P''_1$, and the head difference between the liquid levels in both the towers, the pressure-reduced liquid is fed from the pressure reduction tower 11 to the separation tower 5. At the time when the liquid level in the pressure reduction tower 11 is dropped to $L_1$, the charge value 74 is closed followed by closing the pressure-reduced liquid discharge valve 17 thereby completing the liquid discharge step.

In the above embodiment, one pressure reduction tower is used but a plurality of pressure reduction towers may be connected in parallel to one another. The plurality of towers are operated in different phases of operation cycle so that the high pressure liquid is continuously discharged from the high pressure gas and liquid separation tower along with a continuous feeding of pressure-reduced liquid to the low pressure gas and liquid separation tower 5.

As described above, at the time of feeding of liquid to the pressure reduction tower 11 and also of discharge of liquid from the tower 11, the pressure within a tower located upstream of the tower is made higher than the pressure of the downstream tower. The liquid is fed from one tower to another by the use of pressure differences $\Delta P_1$ and $\Delta P_2$ and head differences among associated towers. Accordingly, upon taking into account an increase and a decrease in liquid level within the pressure reduction tower caused by the expansion of liquid at the time of pressure reduction and the compression of liquid at the time of pressure elevation, it is preferable to design the pressure reduction tower 11 as follows. That is, the pressure reduction tower 11 is so designed as to have a length, 1, so that its top is higher by e than a preset liquid level $L_5$ of the high pressure gas and liquid separation tower 1 and the bottom is lower by f than a preset level $L_6$ of the lower pressure gas and liquid separation tower 5. By this, the liquid level in the pressure reduction tower 11 reaches an equilibrium at a level where a pressure at point A in the pressure reduction tower 11 becomes equal to a pressure at points B, B' of the high and low pressure gas and liquid separation towers 1 and 5 which are at the same level as the point A. Accordingly, if the pressure difference between the preset pressure $P_0$ within the high pressure gas and liquid separation tower 1 and the pressure $P'_1$ within the pressure reduction tower 11 at the time of feed of liquid, i.e. $\Delta P_1 = P_0 - P'_1$, and the difference between the pressure $P''_1$ within the pressure reduction tower 11 and the preset pressure $P'_0$ within the low pressure gas and liquid separation tower 5 at the time of liquid discharge, i.e. $\Delta P_2 = P'_0 - P''_1$ are set according to the lengths e and f, the liquid level does not increase over a preset level nor decrease below a preset level. Accordingly, the pressure reduction apparatus can be operated only by time control. In addition, when the pressure differences $\Delta P_1$ and $\Delta P_2$ are set to correspond to head losses by pipes and valves, it is possible that a level difference, c, at the time of completion of the liquid feeding and a level difference, d, at the time of completion of the liquid discharge can be made zero.

Moreover, a gas flow detector such as a differential pressure detector 76 is provided at the line 4 connected to the pressure reduction tower 11. At the time when the gas flow rate reaches below a certain level, the liquid level within the pressure reduction tower 11 is regarded as reaching the level $L_3$ or $L_1$ thereby appropriately controlling the valves. By this, a level gauge is not needed for the control of the valves. The control of the pressure reduction apparatus without use of any level gauge may be applied to the embodiment of FIG. 6. In this case, an overall length of the pressure reduction tower 11 is properly set similar to the case of FIG. 9. A differential pressure detector 76 is provided at the gas line 4 of FIG. 6 through which a gas is charged or discharged to the pressure reduction tower 11. Valve control is effected in a manner similar to the above embodiment.

Obviously, numerous modifications and variations of the present invention are possible in light of the above teachings. It is therefore to be understood that within the scope of the appended claims, the invention may be practiced otherwise than as specifically described herein.

What is claimed is:

1. A pressure reduction apparatus for solid particle-containing high pressure liquids comprising:

a gas and liquid pressure reduction tower having a gas phase zone and a liquid phase zone;

a high pressure gas and liquid separation tower having a gas phase zone connected to the gas phase zone of said gas and liquid pressure reduction tower through a first line provided with a high pressure gas charge or discharge valve, and a liquid phase zone connected to the liquid phase zone of said gas and liquid pressure reduction tower through a second line having a feed valve for liquid being reduced; and a lower pressure gas and liquid separation tower having a gas phase zone connected to the gas phase zone of said gas and liquid pressure reduction tower through a third line having a low pressure gas charge or discharge valve, and a liquid phase zone connected to the liquid phase zone of said gas and liquid pressure reduction tower through a fourth line having a valve through which a pressure reduced liquid is discharged, wherein prior to opening of the feed valve or the pressure-reduced liquid discharge valve, the higher pressure gas charge or discharge valve, or the lower pressure gas charge or discharge valve is opened so as to increase or decrease a pressure within a corresponding gas and liquid separation tower.

2. A pressure reduction apparatus according to claim 1, further comprising a fifth line parallel to the first line and connecting said high pressure gas and liquid separation tower and said gas and liquid pressure reduction tower, wherein the fifth line further comprises first expansion means and a gas feed valve for pressure elevation, and a sixth line parallel to the second line and connecting said gas and liquid pressure reduction tower and said low pressure gas and liquid separation tower, wherein the sixth line further comprises an exhaust valve for pressure reduction and second expansion means.

3. A pressure reduction apparatus according to claim 2, wherein the gas and liquid pressure reduction tower further comprises a plurality of gas feed valves, a plurality of exhaustion valves, and a plurality of gas and liquid pressure reduction units connecting in parallel to one another through said plurality of gas feed valves for pressure elevation and said plurality of exhaustion valves for pressure reduction, said plurality of gas feed valves being connected to the first expansion means in common at corresponding inlets thereof, said plurality of exhaustion valves being connected in common with said second expansion machine at corresponding outlets thereof.

4. A pressure reduction apparatus according to claim 1, further comprising expansion means disposed in a high pressure gas line branched from the first line.

5. A pressure reduction apparatus according to claim 1, further comprising means for detecting an amount of gas charged into or discharged from said gas and liquid pressure reduction tower through the high pressure gas charge or discharge valve or the low pressure gas charge or discharge valve, and means for controlling an amount of a liquid being reduced in pressure fed into said gas and liquid pressure reduction tower or an amount of a pressure-reduced liquid discharged from said gas and liquid pressure reduction tower on the basis of a signal from said means for detecting an amount of gas.

6. A pressure reduction apparatus according to claim 5, wherein said gas and liquid pressure reduction tower further comprises means for detecting a pressure within the pressure reduction tower, so that after a detected pressure reaches the same level as in a feed system for liquid being reduced in pressure or in a system for pressure-reduced liquid, the charge valve for liquid being reduced in pressure or the discharge valve for pressure-reduced liquid is opened.

7. A pressure reduction apparatus according to claim 1, wherein the first line between said high pressure gas and liquid separation tower and said high pressure gas charge or discharge valve further comprises a pressure control valve, so that a pressure within said gas and liquid pressure reduction tower is set to be lower than a pressure within said high pressure gas and liquid separation tower by said pressure control valve.

8. A pressure reduction apparatus according to claim 7, wherein said gas and liquid pressure reduction tower further comprises a plurality of high pressure gas charge or discharge valves, a plurality of low pressure gas charge or discharges valves, and a plurality of units connected in parallel to one another through said plurality of high pressure gas charge or discharge valves and said plurality of low pressure gas charge or discharge valves.

9. A pressure reduction apparatus according to claim 1, wherein the second line between said low pressure gas charge or discharge valve and said low pressure gas and liquid separation tower further comprises a pressure control valve, so that when a low pressure gas is fed from said gas and liquid pressure reduction tower into said low pressure gas and liquid separation tower, a pressure within said low pressure gas and liquid separation tower is lower than a pressure within said gas and liquid pressure reduction tower.

10. A pressure reduction apparatus according to claim 9, wherein said gas and liquid pressure reduction tower further comprises a plurality of high pressure gas charge or discharge valves, a plurality of low pressure gas charge or discharges valves, and a plurality of units connected in parallel to one another through said plurality of high pressure gas charge or discharge valves and said plurality of low pressure gas charge or discharge valves.

11. A pressure reduction apparatus according to claim 7 or 9, wherein said gas and liquid pressure reduction tower further comprises a top which is higher than a set liquid level of said high pressure gas and liquid separation tower and a bottom which is lower than a set liquid level of said low pressure gas and liquid separation tower.

12. A pressure reduction apparatus according to claim 11, wherein the first line further comprises gas flow rate detector means for detecting states of feeding of the liquid being reduced in pressure and discharge of the pressure-reduced liquid and means for controlling the amount of charge and discharge of liquids based on a detected information signal from said gas flow rate detector means.

13. A pressure reduction apparatus according to claim 12, wherein said gas and liquid pressure reduction tower further comprises a plurality of high pressure gas charge or discharge valves, a plurality of low pressure gas charge or discharge valves, and a plurality of units connected in parallel to one another through said plurality of high pressure gas charge or discharge valves and said plurality of low pressure gas charge or discharge valves.

14. A pressure reduction apparatus according to claim 11, wherein said gas and liquid pressure reduction tower further comprises a plurality of high pressure gas charge or discharge valves, a plurality of low pressure gas charge or discharge valves, and a plurality of units connected in parallel to one another through said plurality of high pressure gas charge or discharge valves and said plurality of low pressure gas charge or discharge valves.

* * * * *